Aug. 14, 1962        L. J. LAPOINTE ETAL        3,049,019
                         DRIVE UNIT
                      Filed July 7, 1961

INVENTORS
LLOYD J. LAPOINTE
RALPH L. PARKER JR.

BY Thomas D. Ross
   Joseph R. Spalla
   ATTORNEYS

United States Patent Office 3,049,019
Patented Aug. 14, 1962

3,049,019
DRIVE UNIT
Lloyd J. Lapointe, West Hartford, and Ralph L. Parker, Jr., Rockville, Conn., assignors to Royal McBee Corporation, Port Chester, N.Y., a corporation of New York
Filed July 7, 1961, Ser. No. 122,486
4 Claims. (Cl. 74—202)

This invention relates to a drive unit; more particularly it relates to a drive unit characterized by controlled means whereby a drive member may be decoupled from a driven member, coupled to drive the driven member in a clockwise direction and coupled to drive the driven member in a counterclockwise direction; and specifically it relates to a drive unit constructed and arranged whereby a constantly driven drive member may be instantly coupled to drive a driven member in one or another direction from a quiescent condition and which can instantly reverse the direction of drive of said driven member.

An object of the invention is in the provision of a novel drive unit.

Another object of the invention is to provide a compact fast acting drive unit coupling arrangement.

Another object of the invention is in the provision of an instantaneously acting clutch for coupling a drive member to a driven member.

Another object of the invention is to provide a drive unit coupling arrangement whereby a drive member may be instantly coupled to a driven member whereby the latter may be driven in either of two directions from a rest position.

A further object of the invention is in the provision of a drive unit coupling arrangement adapted to connect a drive to a driven member whereby the latter is driven in either of two directions and whereby the direction of said driven member may be instantly reversed.

A further object of the invention is in the provision of a clutching device in the nature of an axial or thrust ball bearing wherein the ball bearing races comprise the drive and driven members and the ball bearing retainer the control element.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
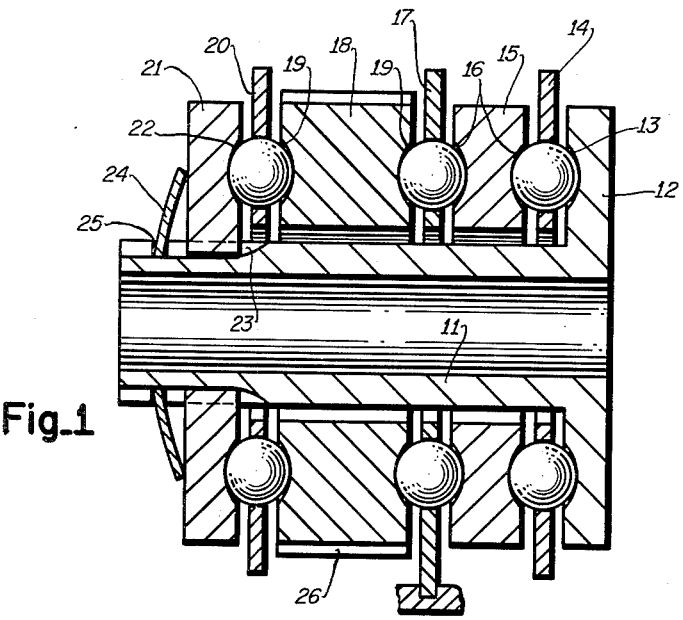
FIGURE 1 is a cross sectional view of a novel drive unit in accordance with the invention.

Referring now to the drawings wherein is illustrated a preferred embodiment there is shown in FIGURE 1 a shaft 11 which is to be driven in a clockwise or a counterclockwise direction or maintained stationary. The shaft is provided either with a collar axially movable relative to but secured for rotation with shaft 11 or with an integral annular flange 12 on its periphery which has formed on one face a ball bearing race 13. Rotatably mounted on the shaft is a first annular ball bearing retainer 14, an annular reversing element 15 having ball bearing races 16 on opposite faces, a second ball bearing retainer 17, an annular drive member 18 having ball bearing races 19 on opposite faces, and a third annular ball bearing retainer 20. An annular collar 21 having a ball bearing race 22 on its face adjacent the third bearing retainer is mounted in a keyway 23 provided in the shaft 11 whereby it is coupled for rotation with the shaft 11. In one embodiment an annular spring 24 retained by an annular groove 25 exerts pressure on the collar 21 and on the other enumerated elements between collar 21 and flange 12 through the balls and aligned cooperating races of the elements whereby they are maintained in interference contact and under pressure at all times. Where flange 12 is axially movable relative to shaft 11 both collar 21 and flange 12 may be loaded. The amount of pressure necessary between balls and races is determined by the loading on shaft 11; the pressure applied being greater for larger loads.

Normally drive element 18 which has gear teeth 26 formed on its periphery is unidirectionally driven e.g. clockwise by gearing or by a toothed belt driven by some suitable motive source. Further ball bearing retainer 17 is fixed by any suitable means so that it cannot rotate relative to shaft 11.

Figure 2:
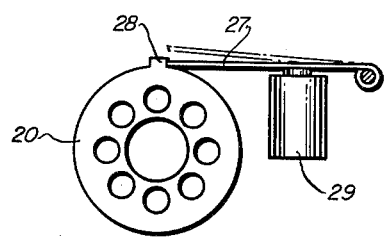
FIGURE 2 is a front view showing control mechanism.

In accordance with the invention ball bearing retainers 14 and 20 are adapted to be selectively held against rotation relative to shaft 11 as by the interposition of a stop member 27 (FIGURE 2) in the path of a shoulder 28 or lug formed on the periphery of the retainers 14 and 20. The stop member 27 in accordance with one embodiment of the invention might be the armature of a solenoid 29 or the stop member may be controlled manually or by any other suitable means.

Figure 3:
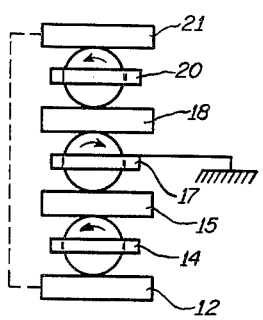
FIGURE 3 is a diagrammatic representation of a drive unit to aid in the explanation of its operation.

As may be more clearly understood with reference to FIGURE 1 and particularly to FIGURE 3 drive member 18 is normally driven unidirectionally e.g. clockwise at a predetermined speed. In accordance with the convention adopted in FIGURE 3 movement of the elements to the right indicates clockwise movement and movement to the left counterclockwise movement. When neither retainer 14 or 20 is held by its associated stop member, the clockwise rotation of drive member 18 rotates the balls in retainers 17 and 20 in the directions illustrated in FIGURE 3. The rotation of the balls in retainer 20 drives retainer 20 clockwise, since it is free to move, and the balls therein simply roll around the race 22 in collar 21. Hence no torque is applied to shaft 11 via collar 21. Since retainer 17 is fixed, the clockwise rotation of the balls therein positively drive the reversing member 15 counterclockise which rotates the balls in retainer 14 counterclockwise. Since retainer 14 is free to move it rotates counterclockwise also and the balls simply roll around race 13 in flange 12. Hence no torque is applied to shaft 11 via flange 12. The above sequence described the neutral position of the drive coupling.

If a counterclockwise rotation of shaft 11 is desired, the stop member associated with retainer 20 is interposed in the path of the lug thereon thereby preventing rotation of the retainer. Under this condition the counterclockwise rotating balls in retainer 20 positively drive collar 21 and hence shaft 11 in a counterclockwise direction as indicated in FIGURE 3. Since flange 12 is connected to shaft 11 it will rotate counterclockwise also and, as the reversing element is also rotating counterclockwise, the unrestrained retainer 14 is carried between flange 12 and element 15, the balls therein remaining stationary.

If clockwise rotation of shaft 11 is the desired mode, retainer 20 is permitted to rotate and retainer 14 is held by its associated stop member. With retainer 14 held, the counterclockwise rotating balls therein frictionally drive the flange 12 and hence shaft 11 in a clockwise direction as indicated in FIGURE 3. The action of retainer 20 being influenced by collar 21 and drive 18 in a manner similar to retainer 14 by flange 12 and element 15.

If the condition of the stop members is such that the shaft is being driven in a clockwise direction and a counterclockwise movement is desired, the stop member associated with retainer 14 may be withdrawn and that associated with retainer 20 interposed simultaneously at which time the shaft 11 will immediately reverse direction.

As described above the driven members are stated to be positively driven by the balls. This will be true as long as the torque rating of the drive unit as determined by the pressure applied by spring 24 exceeds the maximum torque loading to be encountered. Under these conditions slippage cannot occur with the result that the transmission ratio between drive and driven members will always be 1 to 1 which is characteristic of a positive drive coupling.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A drive unit comprising an annular thrust bearing, said thrust bearing having an annular retainer and ball bearings mounted therein, and axially disposed races on either side of said retainer, means constantly maintaining an axial pressure on said races whereby said bearings are in interference contact with said races, said races constituting respectively a drive and a driven member, and means operative at will to restrain rotation of said retainer whereby said driven member is positively coupled to said drive member.

2. A drive unit having a drive member adapted to drive a driven member in either of two directions from a rest position or to reverse the direction of said driven member, said driven member comprising a shaft, three thrust bearings axially mounted on said shaft, the intermediate races of said bearings being common to two bearings, means mounting the outer races against rotation relative to said shaft, at least one of said outer races being axially movable relative to said shaft, means for axially loading said outer races toward one another, said intermediate races constituting a drive member and a reversing means, retainers for the balls of said bearings, means for holding the central ball bearing retainer against rotation, and means for selectively holding said other ball bearing retainers against rotation, said driven member being positively driven in the same direction as said drive member when one of said retainers is held, and in a direction opposite to said drive member when the other of said retainers is held.

3. A drive unit as recited in claim 2 wherein the means for selectively holding said retainers comprises a projection on the periphery of each retainer, and a solenoid controlled stop member associated with each projection, said stop members being adapted to be interposed in the path of said projections.

4. A drive unit comprising a shaft, three axial thrust bearings mounted on said shaft, the intermediate races of said bearings being common to two of said bearings, one of the outer races being fixed to said shaft and the other of said outer races being keyed to and axially movable relative to said shaft, means constantly exerting an axial pressure against said axially movable outer race whereby said thrust beings are axially loaded, bearing retainers, means for holding the central bearing retainer stationary, means for driving one of said intermediate races and said shaft relative to one another, and means for selectively holding the outer bearing retainers against rotation whereby said shaft and intermediate race are positively coupled for rotation in the same direction and in opposite directions respectively.

References Cited in the file of this patent

UNITED STATES PATENTS

| | | |
|---|---|---|
| 764,239 | Harvey | July 5, 1904 |
| 785,703 | Bayrer | Mar. 28, 1905 |
| 1,345,494 | Karl et al. | July 6, 1920 |
| 1,958,756 | Jahraus | May 15, 1934 |
| 2,524,905 | Granqvist | Oct. 10, 1950 |